April 26, 1949.  H. R. ABBRECHT  2,468,354
FILTRATION APPARATUS
Filed Aug. 18, 1944  2 Sheets-Sheet 1

INVENTOR.
HERMANN R. ABBRECHT
BY
Oberlin, Limbach & Day.
ATTORNEYS

April 26, 1949.  H. R. ABBRECHT  2,468,354
FILTRATION APPARATUS
Filed Aug. 18, 1944  2 Sheets-Sheet 2

INVENTOR.
HERMANN R. ABBRECHT
BY
Oberlin, Limbach & Day.
ATTORNEYS

Patented Apr. 26, 1949

2,468,354

UNITED STATES PATENT OFFICE 2,468,354

FILTRATION APPARATUS

Hermann R. Abbrecht, Shaker Heights, Ohio, assignor to The Osborn Manufacturing Company, Cleveland, Ohio, a corporation of Ohio Application August 18, 1944, Serial No. 550,044

6 Claims. (Cl. 210—204)

The present improvements, relating as indicated to filtration apparatus, are based primarily on a novel construction and form of filter element. The methods and apparatus in which such filter elements are employed may vary greatly, e. g. from the separation of flue dust from furnace gases to the separation of solid matters from a liquid vehicle.

One principal object of the present invention is to provide a filter element which instead of possessing uniform filtering characteristics throughout will have a variable characteristic, i. e. will provide interstices diminishing in extent from one face to the other of the element so that successively finer particles will be separated and held out of the fluid medium, whether gas or liquid which is to be filtered. A further object is to provide a filter element having characteristics as stated which will be of simple construction and inexpensive to manufacture. A further object is to provide such an element which may be readily assembled in an apparatus of any desired capacity and which may be readily cleansed, i. e. relieved of accumulated solid material, when occasion requires.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

I have discovered that a filter element possessing a high degree of utility in a large variety of filtering operations may be made in the form of a body of stranded material, wherein the strands diverge from a common center so as to provide interstices diminishing in extent from the outer to the inner surface of said element. In its broader aspect my improved process comprises passing the fluid to be filtered through a body of such stranded material in the same general direction as that wherein the component strands lie. A conveniently available form of such a filter element is found in that type of rotary brush element wherein a layer of stranded material is doubled about a wire or like retaining member, the base of the element being then secured in a U-shaped channel or equivalent holder. Brush elements having the construction just described (also known as brush strip) are currently manufactured in large quantities for use in the construction of rotary and cylindrical brushes. The stranded material which constitutes the body in such brush elements may consist of metal wires of any degree of fineness, and either straight or crimped, as well as of animal hair or of vegetable or synthetic fibers. Depending upon the particular fluid to be filtered, the filter element which I employ may be made in any such form or of any such material.

Figure 1:
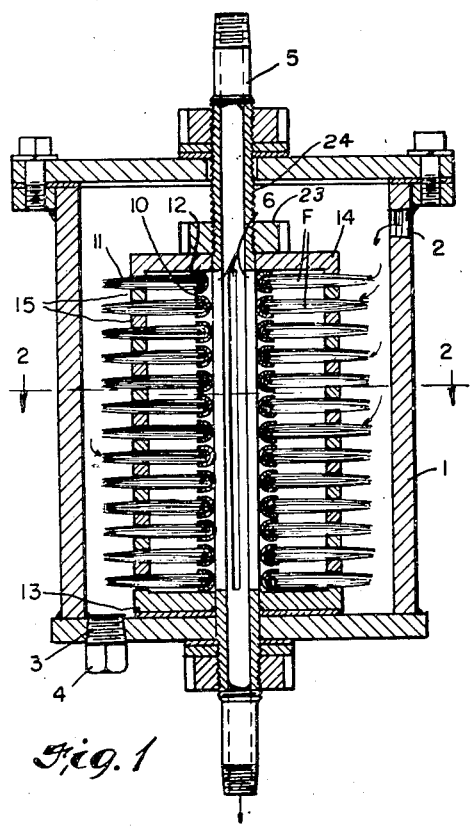
Fig. 1 is a central sectional view of one form of filtration apparatus embodying my present improvements.
Figure 2:
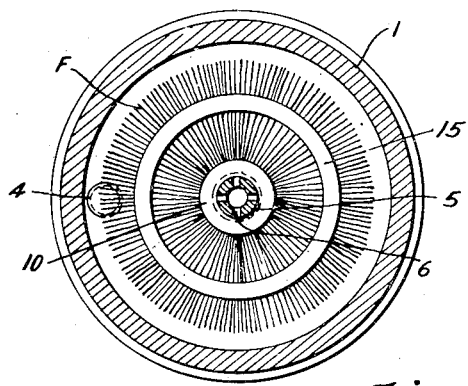
Fig. 2 is a transverse section thereof taken on a plane indicated by the line 2—2 Fig. 1.

Referring to the construction of apparatus illustrated in Figs. 1 and 2, such apparatus will be seen to comprise a chamber 1 of general cylindrical form and preferably having its axis disposed vertically. Said chamber is provided, preferably adjacent its upper end, with an inlet opening 2, while its lower end is provided with an opening 3 normally closed by a plug 4 through which opening the contents of the chamber may be drained when desired.

Centrally mounted in such chamber is a pipe 5 or equivalent tubular element which is formed with a series of longitudinal slots 6 that lie wholly within the chamber, the respective ends of said pipe being threaded for connection with conduits leading from said pipe as desired.

Mounted upon pipe 5 is a series of filter elements F of the construction generally described above. In the particular form illustrated in Figs. 1 and 2, each such element comprises a channel base 10 of circular form adapted to fit closely around the pipe 5, and a doubled layer of stranded material 11 which is held in said base by means of an encircling wire 12. End plates 13 and 14 serve to retain the outermost of the brush elements in spaced relation from the corresponding ends of chamber 1; while annuli or rings 15 of approximately the same diameter as said end plates similarly serve to retain successive elements in spaced-apart relation.

In operation the fluid to be filtered, e. g. furnace gases laden with flue dust, or a liquid vehicle carrying solid material, is caused to enter chamber 1 through opening 2 so as substantially to fill the outer portion of said chamber, i. e. the portion thereof lying outside of the filter elements and associated spacing members. Thence such fluid will pass radially inwardly through the body of stranded material which composes the respective filter elements towards the center thereof, finally escaping between the bases of the elements into the slots 6 in pipe 4 and thence passing outwardly through one end or the other of said pipe as desired. Since the fluid passes inwardly in the same general direction as that wherein the component strands lie it will obviously encounter interstices that diminish in extent from the outer face toward the center of the assembled body of brush elements.

Figure 3:
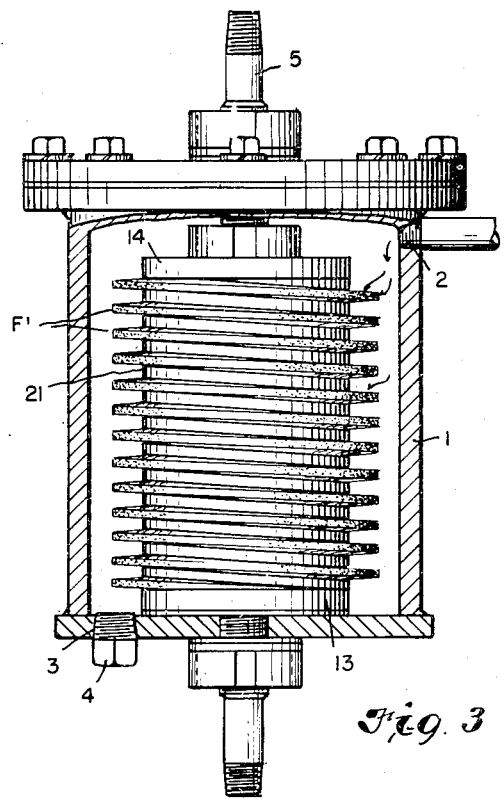
Fig. 3 is partly a central section and partly a side elevation of another modification in construction.

In the further modified construction of apparatus illustrated in Fig. 3 the chamber and directly appurtenant parts are identical with those illustrated in Fig. 1 and bear the same reference numerals. However, instead of employing a plurality of circular filter elements F, a single element F', arranged in helical form but otherwise constructed in the same manner are such circular elements, is utilized. Also instead of utilizing a series of annuli or rings 15, a single helically formed spacing member 21 is interposed between the successive convolutions of said filter element. Such successive convolutions of the latter may be considered the equivalent of the individual circular filter elements of the first described form of apparatus and so likewise the successive convolutions of spacing member 21 may be considered the equivalent of individual spacing rings 15.

Figure 4:
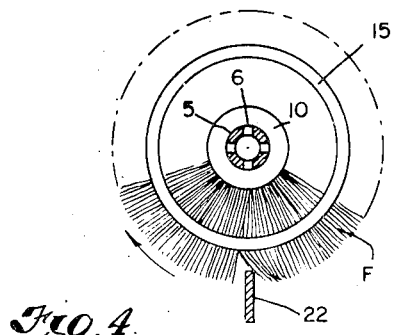
Fig. 4 is a view more or less diagrammatic in character illustrating means for the removal of accumulated solid material from a filter constructed according to any of the foregoing forms.

In order to remove accumulated solid material filtered out in either of the foregoing forms of apparatus, the plug closing the outlet opening in the chamber may be removed and a suitable fluid, preferably a liquid, supplied to the central pipe upon which the filter elements are mounted so as to flow in a direction the reverse of that in which the fluid being filtered flows. There is furthermore illustrated in Fig. 4 a device specially designed for use in cleaning the filter elements, such device comprising simply a blade 22 mounted in a general radial direction so as to engage the outer portion of the series of filter elements. Upon then relatively rotating such elements and blade, accumulated solid material in the elements, particularly where dry or dust-like in character, will be drawn out and can so be readily removed. The device just described may be incorporated in the chamber, provision in such case being made to rotate the pipe on which the brush elements are mounted as a shaft, or such pipe with the brush elements mounted thereon may be removed from the chamber and rotated against such blade, or vice versa, and after being cleansed the assembly then returned to the chamber for further filtration operation. When cleaning the filter elements as by passing a fluid therethrough in a direction opposite to the flow of a fluid being filtered, it is very desirable to relax the clamping pressure of end plates 13 and 14 (Fig. 1) as by turning the nut 23 on the threads 24, so that the stranded material F will not be compacted, thereby facilitating removal of the deposit therefrom. Such end plates will then again be tightened down by the nut 23 before resuming the filtration operation. By rapidly revolving the rotary filter during the back-flushing operation, the action of centrifugal force causes the cleaning fluid to be forced more rapidly and thoroughly through the filter material which has been released from compacting pressure, and also causes the accumulated solid precipitate to be more readily dislodged from the filter material. Scraper blade 22, by agitating the filter material, renders such action still more effective (Fig. 6).

From the foregoing description it will be seen that by the use of the novel filtering means described a filtration apparatus capable of a wide range of use is provided. As indicated, one particular field is the removal of dust from a gaseous medium and this field will include not merely the removal of flue dust from combustion gases but also the dust found present in the atmosphere where it is desired to purify the latter for use in so-called air conditioning, where the filtering means at present employed are relatively crude and inefficient as well as difficult to maintain in condition for indefinite use. It should also be pointed out that my improved filter element may be manufactured quite inexpensively where the fluid to be filtered does not require the use of stranded material of a specially resistant character, and even in such case the element lends itself to methods of manufacture and of assembly much superior to those possessed by other known types of filter elements.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In filtration apparatus, the combination of a filter element comprising a plurality of axially associated annular bodies of substantially radially extending stranded material providing progressively inwardly narrowing interstices between such strands, and annular rings interposed between such bodies of stranded material; means adapted to supply a fluid to be filtered to the outer portion of said filter element; and means adapted to withdraw filtered fluid from the inner portion of said filter element within the region defined by said annular rings.

2. In filtration apparatus, the combination of a filter element comprising a plurality of axially associated annular bodies of substantially radially extending strands providing progressively inwardly narrowing interstices between such strands, and annular rings interposed between said bodies of strands; means adapted releasably to apply axially compacting pressure through said rings on said bodies of strands; means adapted to supply a fluid to be filtered to the outer portion of said filter element; and means adapted to withdraw filtered fluid from the inner portion of said filter element within the region defined by said annular rings.

3. In filtration apparatus, a filter assembly comprising an annular base having radially extending strands secured thereto, means adapted to supply a fluid to be filtered generally axially of such strands, and means adapted releasably to apply laterally compacting pressure on such strands during such filtration operation.

4. In filtration apparatus, a filter assembly comprising a base having a body of strands secured thereto and extending therefrom in general side-by-side relationship, means adapted releasably to apply laterally compacting pressure on said strands, and means adapted to pass a fluid to be filtered through said body of strands generally axially thereof.

5. A rotatable filter comprising an annular rotor base having radially extending strands secured thereto, means adapted to pass a fluid between the exterior and interior of said filter generally axially of such strands, and means adapted releasably to apply compacting pressure laterally on such strands.

6. A rotatable filter comprising an annular rotor base having radially extending strands secured thereto, means adapted to pass a fluid between the exterior and interior of said filter generally axially of such strands, means adapted releasably to apply compacting pressure laterally on such strands, and means operative to agitate the end portions of such strands during rotation of said filter to facilitate cleaning thereof.

HERMANN R. ABBRECHT.

REFERENCES CITED

The following references are of record in the file of this patent:

UNITED STATES PATENTS

| Number | Name | Date |
|---|---|---|
| 602,832 | Dash | Apr. 26, 1898 |
| 630,363 | Krause | Aug. 8, 1899 |
| 687,979 | Chambers | Dec. 3, 1901 |
| 1,833,315 | Burhans | Nov. 24, 1931 |
| 1,991,847 | Durgen | Feb. 19, 1935 |

FOREIGN PATENTS

| Number | Country | Date |
|---|---|---|
| 292,621 | Germany | June 20, 1916 |